(12) United States Patent
Gilpin

(10) Patent No.: US 6,928,258 B2
(45) Date of Patent: Aug. 9, 2005

(54) SCANNER WITH DEPLOYABLE SUPPORT

(75) Inventor: Kenneth Jack Gilpin, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 10/173,869

(22) Filed: Jun. 18, 2002

(65) Prior Publication Data

US 2003/0231353 A1 Dec. 18, 2003

(51) Int. Cl.⁷ .............................................. G03G 15/00
(52) U.S. Cl. ...................................... 399/377; 399/362
(58) Field of Search ................................ 399/377, 362, 399/361; 355/128, 122, 74, 75

(56) References Cited

U.S. PATENT DOCUMENTS

| 5,523,820 A | * | 6/1996 | Mooney et al. ................ 355/76 |
| 6,129,270 A | | 10/2000 | Piazza .......................... 235/379 |

FOREIGN PATENT DOCUMENTS

| EP | 0926567 A2 | * | 6/1998 |
| GB | 2380087 | | 3/2003 |
| JP | 7322018 | | 12/1995 |
| JP | 2000-321683 | * | 11/2000 |

* cited by examiner

*Primary Examiner*—Anthony H Nguyen

(57) ABSTRACT

In accordance with one specific, exemplary embodiment of the invention, there is provided a scanner housing comprising a back wall and opposed side walls; a transparent platen mounted on the housing for receiving an object to be scanned; and a support carried by the housing, the support being movable relative to a wall of the housing between a stowed position and a deployed position, the support comprising a surface to support an overhanging portion of the object when the support is in a deployed position.

In accordance with another specific, exemplary embodiment of the invention, there is provided a scanner comprising a housing comprising opposed side walls and a back wall and a transparent platen mounted on the housing for receiving a scannable object. The scannable object may comprise a portion that will overhang one of the walls of the housing during the scanning operation. The scanner further comprises a support carried by the scanner housing, the support being movable relative to the one wall of the housing between a stowed position and a deployed position. The support comprises a surface positioned to support the overhanging portion of the scannable object in the deployed position of the support.

14 Claims, 3 Drawing Sheets

SCANNER WITH DEPLOYABLE SUPPORT

BACKGROUND OF THE INVENTION

1. Field of the Invention

The present invention relates generally to scanners, and more particularly to a scanner having a deployable support.

2. Description of the Related Art

A flatbed scanner generally comprises a housing, a transparent platen supported by the housing and an object-imaging device under the platen. An object, such as a document or photograph, to be scanned is supported face down on the transparent platen whose upper, object-supporting surface defines the approximate image plane of the object. The object-imaging device is translatable beneath the platen to scan the object and convert the optically scanned text or graphics to a digital image that may be stored in a computer memory.

To obtain a high quality image, objects that are to be scanned need to be held flat against the object-supporting surface of the platen and stationary relative thereto. Objects such as individual photographs or documents are easily held in place, typically by the hinged cover of the scanner. However, the pages of larger, bulkier objects such as books or photo albums are often more difficult to maintain in a flat, fixed position on the scanner platen. For example, when the side of an open book having the page to be scanned is placed on the platen, the opposite side of the open book often overhangs the side of a scanner. Depending upon the thickness of the book, image distortion may result from the portion of the page near the spine curving upwardly and away from the platen. Another problem is that the page to be scanned may move on the platen as gravity pulls the overhanging side of the book down. In either case, a poor quality image may result. Consequently, a user is often inconvenienced by having to manually hold up the overhanging side of the book or to place supporting items, such as a stack of books or the like, under the overhanging side.

SUMMARY OF THE INVENTION

In accordance with one specific, exemplary embodiment of the invention, there is provided a scanner housing comprising a back wall and opposed side walls; a transparent platen mounted on the housing for receiving an object to be scanned; and a support carried by the housing, the support being movable relative to a wall of the housing between a stowed position and a deployed position, the support comprising a surface to support an overhanging portion of the object when the support is in a deployed position.

In accordance with another specific, exemplary embodiment of the invention, there is provided a scanner comprising a housing comprising opposed side walls and a back wall and a transparent platen mounted on the housing for receiving a scannable object. The scannable object may comprise a portion that will overhang one of the walls of the housing during the scanning operation. The scanner further comprises a support carried by the scanner housing, the support being movable relative to the one wall of the housing between a stowed position and a deployed position. The support comprises a surface positioned to support the overhanging portion of the scannable object in the deployed position of the support.

BRIEF DESCRIPTION OF THE DRAWINGS

The foregoing and other objects, features and advantages of the invention will be evident to those skilled in the art from the detailed description, below, taken together with the accompanying drawings, in which.

DETAILED DESCRIPTION OF THE INVENTION

Figure 1:
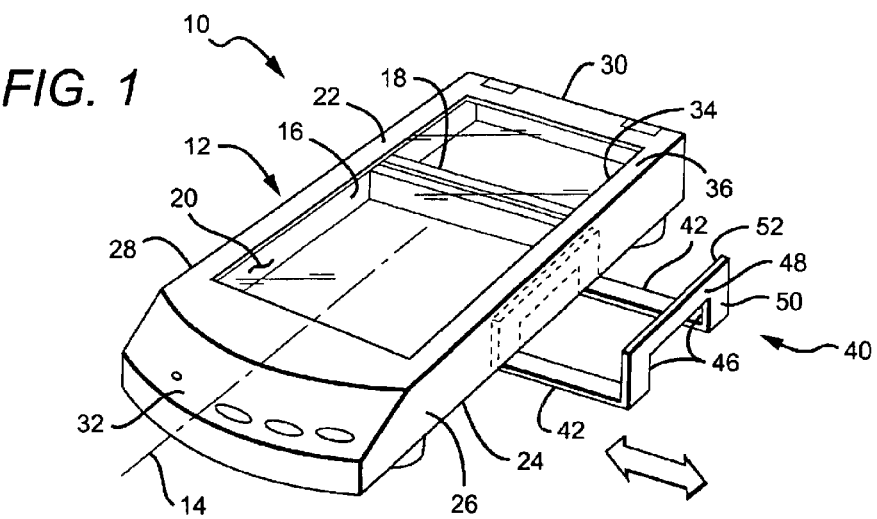
FIG. 1 is a schematic, perspective view of a scanner carrying a deployable object support in accordance with an embodiment of the present invention.

With reference to FIG. 1, there is shown in schematic form a scanner 10 comprising a housing 12 extending along a longitudinal direction 14, a transparent platen 16 carried by housing 12 and a transversely-extending object-imaging device or carriage 18 under the platen. The platen has a planar, object-supporting upper surface 20 defining the approximate image plane of an object to be scanned. The carriage 18 is adapted to be driven in a longitudinal direction along guide rails or the like. For simplicity, the scanner control system, the carriage drive and guide rails, the hinged scanner housing cover and other conventional features are not shown, it being understood that these features are well-known in the art.

Housing 12 comprises a top wall 22, a bottom wall 24, opposed side walls 26, 28, and a transverse back wall 30. The housing 12 comprises a front portion 32 adapted to enclose the scanner control system. The top wall 22 of the housing 12 has a generally rectangular opening or frame 34. The perimeter of the platen 16 is attached to the top wall 22 of the housing about the rectangular frame 34. The top wall 22 of the housing has an upper surface 36 which, together with the upper surface 20 of the platen, defines a scanner bed.

During reflective scanning, the lower surface of a scannable object such as a document or a page of a book, photo album or the like, is placed in contact with the upper surface 20 of the platen 16 and is illuminated along a transverse linear strip or scan line by a light source on the carriage 18. A beam of light reflected from the illuminated scan line passes through a light-receiving slit in the carriage to a photodetector array via a system of mirrors.

Figure 2:
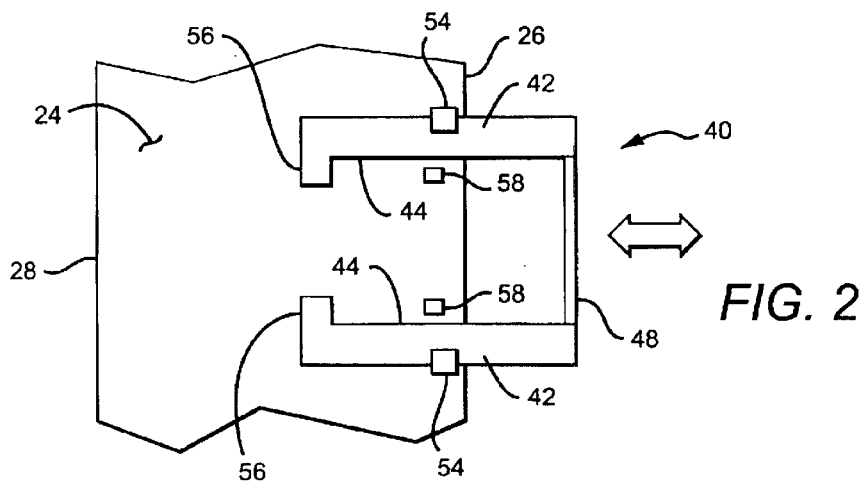
FIG. 2 is a bottom plan view of the scanner of FIG. 1 showing certain details of the object support.

With reference now also to FIG. 2, in accordance with a first embodiment of the invention, the scanner includes a support 40 that is movable from a stowed position (shown in broken lines) to a deployed position relative to the side wall 26 of the scanner housing. In accordance with the first embodiment, the support 40 comprises an L-shaped bracket of stiff sheet metal, plastic, or the like, including a pair of spaced, parallel, transversely extending legs 42 each having an inner end 44 and an outer end 46. The outer ends 46 of the legs 42 are joined by a bridge 48. The outer ends 46 of the legs are bent to form an upstanding bracket portion 50 defining an upper, longitudinally extending edge 52 lying approximately in the plane of the upper surface of the platen.

The upper edge 52 of the upstanding portion of the bracket functions as a support surface for an overhanging portion of an object to be scanned.

Figure 6:
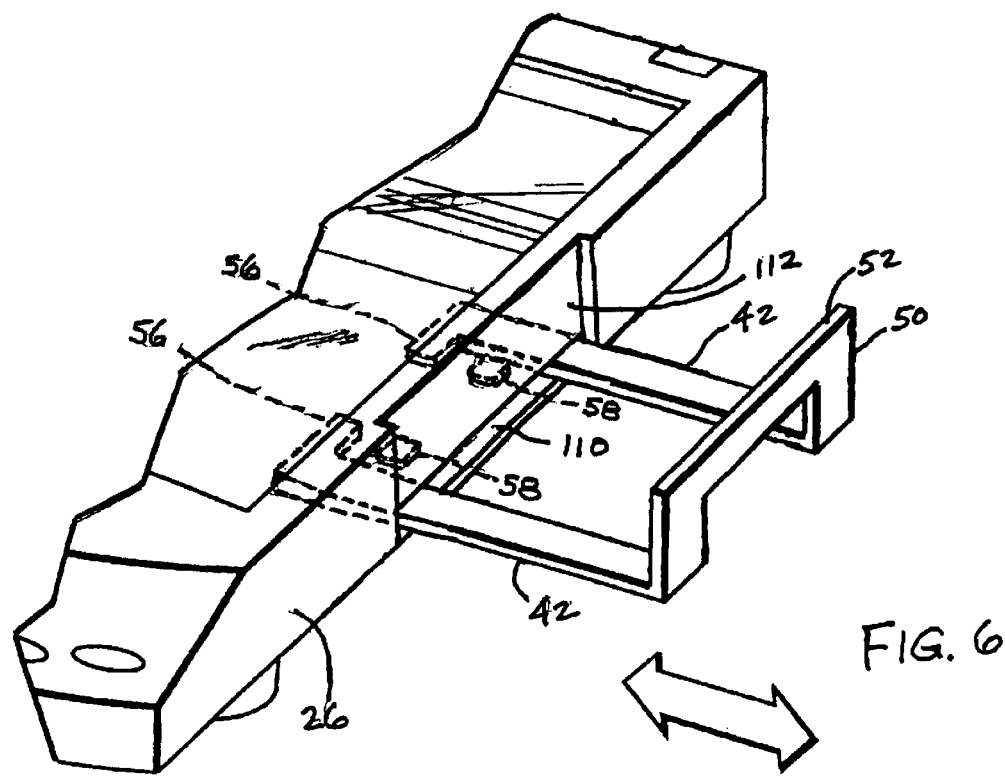
FIG. 6 is a perspective view of a portion of a scanner illustrating other variations of the invention.

As shown in FIG. 2, the legs 42 are slidably received and retained within guides 54 attached to an exterior surface of the bottom wall 24 of the scanner housing. The inner ends 44 of the legs include inwardly directed tabs 56 which, when the bracket is fully deployed, engage stops 58 projecting from the exterior surface of the bottom wall of the housing. Alternatively (FIG. 6), it will be evident to those skilled in the art that the guides 54 and the stops 58 may be mounted inside the scanner housing 12, for example, on an inner surface of the bottom wall 24, with the legs 42 disposed to slide in and out of the housing through an opening 110 (or individual openings, one for each leg) in the side wall 26 of the housing 12.

Figure 3:
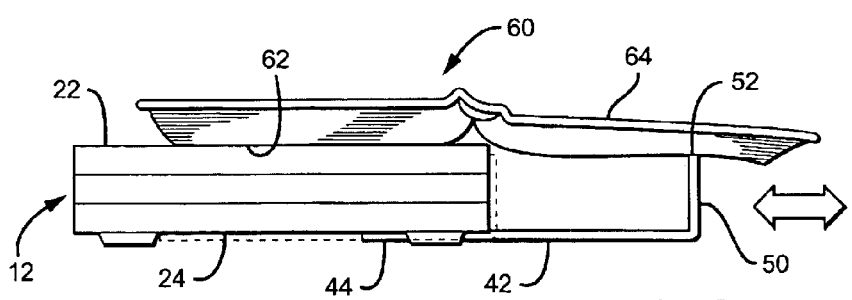
FIG. 3 is an end elevation view of the scanner of FIG. 1 showing how an overhanging portion of an book is supported by the object support.

With reference to the end elevation view of FIG. 3, a book 60, open to a page 62 to be scanned, is shown supported by the scanner bed and the upper edge 52 of the bracket which has been pulled away from the scanner side to a deployed position. An overhanging side 64 of the book is supported by the upper edge 52 of the bracket at a height such that the page to be scanned can be pressed flat against the platen. The bracket functions as well to resist shifting of the book relative to the platen. The bracket may be pulled out from the side of the scanner housing a distance that provides the best support for an object whose contents are to be scanned.

Following the scanning operation, the bracket may be pushed back from its deployed position to its stowed position in which the upstanding portion 50 of the bracket lies generally flat against the side wall 26 of the scanner housing. Further in this connection, it will be apparent to those skilled in the art that the side wall 26 may be recessed at 112 (FIG. 6) to receive the upstanding portion 50 of the bracket so that in the stowed position of the bracket the outside surface of the portion 50 will be flush with the exterior surface of the side wall 26.

Although the support edge 52 of the slidable bracket is shown in the drawings as lying approximately in the plane of the upper surface of the platen, this need not be the case. The support surface may be lower or higher than the platen surface depending upon the object to be supported; for example, in the case of a bound volume, the support edge may be lower than the plane of the platen surface to assure that the page being scanned lies flat on the platen. It will be evident that the upstanding portion of the bracket may be made vertically adjustable to accommodate the overhanging portions of objects of various sizes and bulk, all with the objective of having the page or document to be scanned lying flat on the platen and providing a firm support for the object so as to reduce any relative movement between the object and the platen during the scanning operation.

Figure 4:
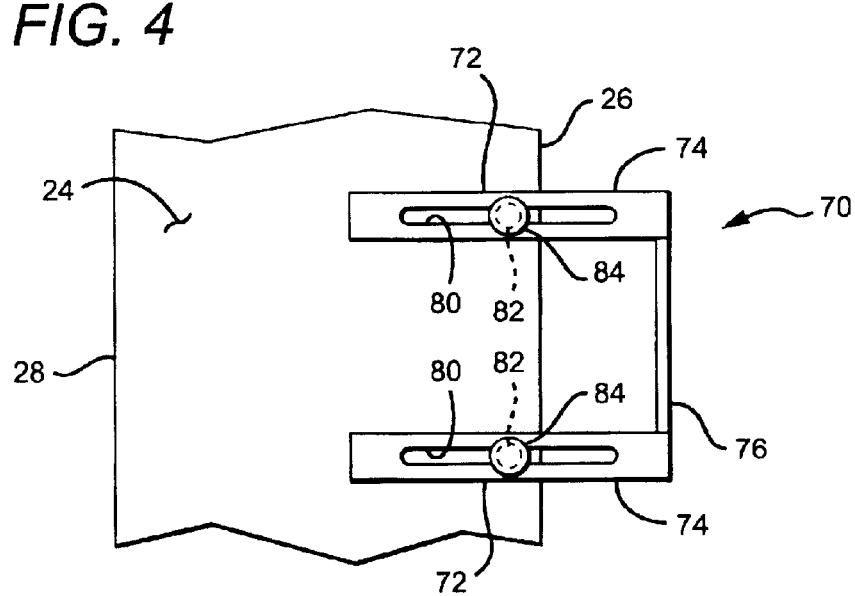
FIG. 4 is a bottom plan view of a scanner carrying a deployable object support in accordance with another embodiment of the invention.

With reference to FIG. 4, there is shown a portion of the scanner 10 having a deployable object support 70 in accordance with a second embodiment of the invention. The support 70 of the second embodiment comprises a bracket identical to that of the first embodiment in that it comprises a pair of spaced apart, parallel, transversely extending legs 72 coupled at their outer ends 74 by means of an upstanding bridge 76 defining an upper edge providing a support surface for an overhanging portion of an object to be scanned. The bracket 70 of the second embodiment differs from the first embodiment in that each leg 72 of the second embodiment is provided with an elongated slot 80 for receiving a guide post 82 projecting from the bottom wall of the scanner. Each guide post has an enlarged head 84 for holding the associated leg in place against the bottom wall 24 of the scanner housing 12. The bracket is slidably movable relative to the side 26 of the scanner housing along the posts between a stowed position in which the upstanding portion of the bracket lies against the side 26 of the housing and a deployed position in which the upstanding portion is spaced apart from the housing side. The support may be moved to a deployed position away from the side of the housing an appropriate adjustable distance to provide the necessary support for the overhanging portion of the object. When not in use, the bracket may be simply pushed back to its stowed position. Alternatively, as mentioned in connection with the first embodiment, the guide posts 82 may be mounted inside the scanner housing, with the legs 72 slidable in and out of the scanner housing through an opening (or individual openings) in the side wall of the housing, and the side wall may be recessed to receive the upstanding portion of the bracket so that said portion will be flush with the side wall in the stowed position of the bracket.

Figure 5:
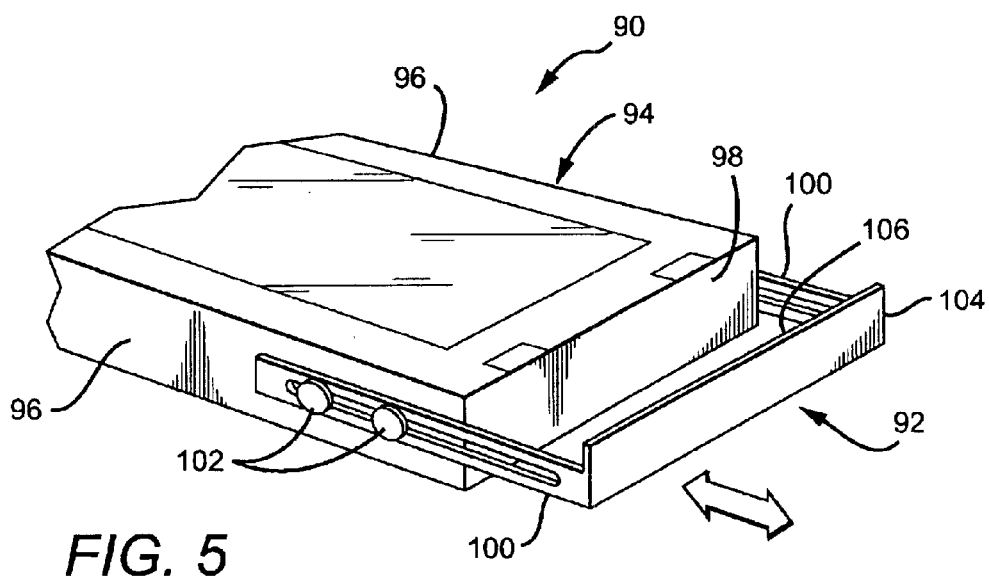
FIG. 5 is a schematic, perspective view of a portion of a scanner carrying a deployable object support in accordance with a further embodiment of the invention.

FIG. 5 shows a portion of a scanner 90 carrying a deployable scannable object support 92 in accordance with a third embodiment. The scanner comprises a housing 94 having opposed, side walls 96 and a transverse back wall 98. As before, the object support 92 preferably comprises a stiff, sheet metal or plastic bracket and is designed to support a portion of an object, such as an open book, that overhangs the back wall 98 of the scanner housing. In order to scan a page of the open book, the hinged cover of the scanner is removed from the back end of the scanner; such a removable cover is a feature of many scanner models.

The deployable bracket 92 comprises bilateral, slotted legs 100 each mounted for slidable movement along a pair of posts 102 projecting outwardly from the associated side wall 96 of the scanner housing adjacent to the back wall thereof. The legs 100 are joined at their rear extremities by an upstanding bridge 104 having an upper edge 106 serving as a supporting surface for the overhanging part of the object to be scanned.

In use, the bracket 92 is moved from a stowed position in which the bridge 104 engages the back wall 98 to a deployed position away from the back wall a distance that will provide appropriate, stable support for the overhanging part of the object while assuring that the page to be copied can be made to lie flat against the platen without shifting. Following the scanning operation, the bracket 92 may be pushed back to its stowed position. Again, as mentioned in connection with the first and second embodiments, the posts 102 may be internally mounted with the legs 100 being movable in and out of the housing through an opening or openings in the back wall 98, and further, the back wall may be recessed to receive the bridge 104.

What is claimed is:

1. A scanner housing comprising:
   a back wall and opposed side walls;
   a transparent platen mounted on the housing for receiving an object to be scanned; and
   a support carried by the housing, the support being movable relative to a wall of the housing between a stowed position and a deployed position, the support comprising a surface to support an overhanging portion of the object when the support is in a deployed position, the support comprising a portion mounted on a bottom wall of the housing for slidable movement relative thereto.

2. The scanner housing of claim 1 in which:
   the surface for supporting the overhanging portion of the scannable object lies in the plane of the object-receiving surface of the platen.

3. The scanner housing of claim 1 in which:

said portion of the support comprises a pair of spaced apart, parallel legs.

4. The scanner housing of claim 3 in which:

each leg comprises an elongated slot for receiving a guide post projecting from the bottom wall of the housing.

5. The scanner housing of claim 3 in which:

each leg comprises an elongated slot for receiving a guide post projecting from the bottom wall of the housing.

6. The scanner housing of claim 1 in which:

the housing has an interior; and said portion of the support is mounted to slide in and out of the interior of the housing through an opening in a wall thereof.

7. The scanner housing of claim 1 in which:

the support is movable relative to the back wall of the housing.

8. The scanner housing of claim 1 in which:

the support comprises a portion slidably mounted on the opposed side walls of the housing.

9. A scanner housing comprising:

a back wall and opposed side walls;

a transparent platen mounted on the housing for receiving an object to be scanned; and a support carried by the housing, the support being movable relative to a wall of the housing between a stowed position and a deployed position, the support comprising a surface to support an overhanging portion of the object when the support is in a deployed position, and in which the support comprises an upstanding portion defining the surface for supporting the overhanging portion of the object.

10. The scanner housing of claim 9 in which:

said wall of the housing is recessed to receive the upstanding portion of the support in the stowed position thereof.

11. The scanner housing of claim 9 in which:

the support is movable relative to the back wall of the housing.

12. The scanner housing of claim 9 in which:

the support comprises a portion slidably mounted on the opposed side walls of the housing.

13. A scanner comprising:

a housing comprising opposed side walls and a back wall;

a transparent platen mounted on the housing for receiving a scannable object comprising a portion that will overhang one of the walls of the housing during the scanning operation; and a support carried by the housing, the support being movable relative to the one wall of the housing between a stowed position and a deployed position, the support comprising a surface positioned to support the overhanging portion of the scannable object in the deployed position of the support, the support comprising an upstanding portion defining the surface for supporting the overhanging portion of the object.

14. The scanner of claim 13 in which:

the surface for supporting the overhanging portion of the scannable object lies in the plane of the object-receiving surface of the platen.

* * * * *